Figure 1:
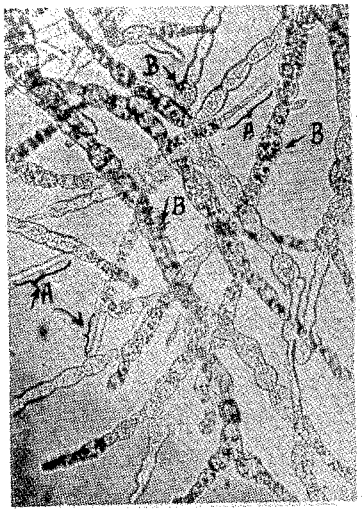
Figure 2:
Figure 3:
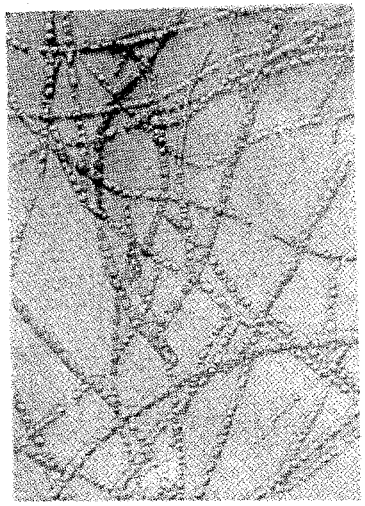

Patented Apr. 4, 1944

2,346,011

UNITED STATES PATENT OFFICE 2,346,011

PROCESS FOR CULTIVATION OF FAT-FORMING MOLDS

Helmut Damm, Duesseldorf, Germany, assignor, by mesne assignments, to The Procter & Gamble Company, Cincinnati, Ohio, a corporation of Ohio Application August 24, 1940, Serial No. 354,076
In Germany August 31, 1939

9 Claims. (Cl. 195—79)

The present invention relates to microorganisms that permit the production of fat and other cell-building materials and to a process for the cultivation thereof.

In carrying out microbiological processes with the aid of true molds, it has hitherto been the aim of investigators to cultivate the pure mycelium from the vegetative reproductive forms, because it possesses the most uniform biochemical properties. It is further known that this mycelium grown by surface culture is capable of forming both conidia as well as chlamydospores or buds (gemmae). The formation of conidia may be very extensive, but the proportion of chlamydospores to the whole culture mass is very low (see: A. Jørgensen: Die Mikroorganismen der Gärungsindustrie, 1940 Table XVI). These chlamydospores are most characterized by being of much larger diameter than the mycelium from which they have arisen. Their cell wall is distinctly thicker. For that reason they are frequently termed "permanent or quiescent forms"; they are filled with reserve food-materials remarkable for their high content of fat and protein. These permanent forms are to be found among numerous representatives of the classes Ascomycetes and Phycomycetes.

One object of the present invention is to cultivate microorganisms of such a nature as will make it possible to produce fat and other cell-building materials, such as the sterols, carotin, and chitin, in a simple and economic way.

Another object of the present invention is to create a process for the cultivation of fat-forming microorganisms that will provide a maximum yield of fats and therewith maximum utilization of the nutrient solution.

A further object of the present invention is to cultivate fat-forming microorganisms submerged in the nutrient solution, instead of culturing them on the surface thereof.

A particular object of the present invention is the submerged cultivation of microorganisms of the classes of Ascomycetes and Phycomycetes in such a way as to produce a high fat content of the culture mass.

The classes of fungi just referred to are fundamentally capable of developing the permanent forms described, that is to say, chlamydospores or gemmae, and the present invention consists in aerating representatives of the said two classes of fungi capable of submerged growth in nutrient solutions of appropriate composition in order to prevent the formation of a crust and to attain rapid reproduction. Aeration may be applied in the form of coarse bubbles or of very fine bubbles of air, and may be supported, if desired, by stirring. The consumption of nutrients and the reaction conditions are thereby regulated in such a way that the culture medium towards the close of the fermentation process consists practically exclusively of the said growth forms or their immediately preceding stage, i. e., mycelium with wide lumina filled with reserve food-materials.

Fermentation is carried out in closed vessels, such, for example, as kettles. The bottom of the said kettles is provided with a device for blowing in finely divided sterilized air and a discharge opening capable of being closed. The cover is fitted with devices for blowing off air and suitable devices are also provided for admission of the nutrient solution and of the stock culture, as well as for taking samples.

Microorganisms that fall under the foregoing general characteristics may belong, for example, to the following genera: Rhizopus, Mucor, Mortierella and Gibberella.

No generally applicable directions for carrying out the said cultivation can be given, but optimum culture conditions must be determined by preliminary trials for each single species and occasionally even for each race. It may be said in a general way, however, that the microbes are first offered all nutrients in sufficient quantity to ensure good nourishment and still to provide an excess of carbohydrates during the last stage when the sources of nitrogen and phosphorus are practically completely exhausted. The hydrogen ion concentration of the culture medium should be generally maintained at from pH 2.4 to 6.8.

Numerous types of nutrients, more especially carbohydrates, can be used for carrying out the process of the present invention. The nutrient solution must of course contain phosphorus and nitrogen compounds. Numerous industrial by-products and residues can be used as nutrients, such, for example, as molasses, sulfite liquors, and many other products. A good nutrient solution for the purpose of the present invention may contain per cubic metre, for example:

Carbohydrates capable of fermentation__
------------------------------kilos____ 35–70
$P_2O_5$ ------------------------------do____ 0.3–0.6
N--------------------------------do____ 0.6–1.0
$MgSO_4.7H_2O$ -------------------do____ 0.3
Vegetable extracts, such as an aqueous
  extract of malt-germs_____litres____ 50–100

The following is a description of the process in detail. A submerged stock culture consisting of normal mycelium is inoculated in the nutrient solution. As the result of suitable nourishment and appropriate aeration, the width of the lumen of the mycelium increases by from two to three times its original diameter within the first 24 hours and the formation of droplets of fat sets in, serving as a reserve stock of fat for the organism. During the ensuing period, while continuously aerating, a formation of fresh mycelium takes place and the fat content of the existing mycelium further increases. The mycelium with a wide lumen and its visibly increasing fat content is the so-called pre-stage of the formation of chlamydospores. The process of maximum fat formation may be attained either during the said pre-stage, or only immediately during the formation of chlamydospores.

Aeration may be followed by a period of quiescence, leading to fatty degeneration of the culture mass. During this period of rest care must be taken to obviate the formation of a crust. The protein content thereby decreases and the fat content of the cell rises to about 60 per cent of the dry mass, a result that has hitherto never been attained in industrial application. The mycelium is then separated by centrifuging or filtration. It may be immediately subjected to further treatment in its fresh, moist condition, or the bulk of the water may be removed by cautious drying. The fat is recovered by extraction with a fat solvent, which operation, if desired, may be preceded or followed by treatment with other solvents. The properties of the fat produced by degeneration are practically identical with those of the reserve stock of fat formed during the first stage, as hereinbefore described.

The accompanying illustrations will serve to elucidate the nature of the new invention.

Fig. I shows Ascomycetes in which practically the whole of the mycelium has already reached the pre-stage of the formation of chlamydospores, which are filled with droplets of fat. The difference between the width of the lumen of the original mycelium (A) and its width in the pre-stage (B) is very clearly brought out.

Fig. II represents the same principle in the case of Phycomycetes. Here also there is a great difference between the lumen of the original mycelium (C) and the wide fat-containing lumen of the pre-stage of the chlamydospores (D) produced as the result of the process of the present invention.

Fig. III illustrates fatty degeneration, whereby the fat content amounts practically to 60 per cent of the dry mass. Practically no more protein is to be detected and the cells are almost completely filled with fat droplets of various size.

The following examples illustrate the nature of the present invention and methods of carrying it into practical effect, but the invention is not confined to these examples.

Example 1

*Rhizopus oligosporus.*—A culture of *Rhizopus oligosporus* adapted to a liquid culture medium was aerated for from two to four days in a solution containing 6 per cent of invert sugar and 5 per cent of beer wort, together with the necessary sources of nitrogen and phosphorus, as well as traces of elements. The pH at the completion of fermentation was 3.42, as against an initial pH of 4.03. The mycelium was removed by centrifuging and cautiously dried.

The dry culture mass had a fat content of 22.8 per cent. Less than one per cent of alcohol was formed.

Example 2

*Mucor racemosus.*—A culture of *Mucor racemosus* adapted to a liquid culture medium was aerated with large bubbles of air for 67 hours in a solution containing about 6 per cent invert sugar, 5 per cent beer wort, together with the necessary sources of nitrogen and phosphorus. The pH at the completion of fermentation was 2.56, as against an initial pH 3.75 of the culture solution.

The dry culture mass had a fat content of 12 per cent.

Example 3

*Mortierella pusilla.*—A culture of *Mortierella pusilla* prepared by the aeration process with a fat content of about 25 per cent calculated on the dry mass was allowed to rest for three days, stirring occasionally. The pH was then found to be 4.48 and the fat content had risen to 59.6 per cent of the dry mass.

Besides fat, other valuable cell-building materials, such, for example, as proteins, sterols, membranous substances, and so forth, can also be obtained.

Example 4

*Gibberella.*—A culture of Gibberella adapted to a submerged growth was aerated with very fine bubbles of air at a temperature of 24 to 26° C. in a four per cent solution of sugar together with the necessary sources of nitrogen and phosphorus, the initial pH of the culture solution being 3.5. After aerating for 40 hours the culture mass had a fat content of 35 to 40 per cent, calculated on the dry mass.

It is to be understood, that the invention is not limited to the specific compounds, microorganisms, compositions and reactive conditions specifically disclosed herein, but that many modifications may be made which will be within the import of the invention and within the scope of the appended claims.

I claim:

1. A process for producing increased yields of fats which comprises submersing a fat-forming mold that develops chlamydospores in an acidic nutrient solution, inducing fermentation of said solution and growing said molds in submersion therein while aerating the solution, thereby increasing the yield of fats as compared to surface growths.

2. A process for producing fats and other cell-building materials which comprises submersing a fat-forming mold that develops chlamydospores in an acidic nutrient solution, inducing fermentation of said solution and growing said molds in submersion therein while aerating the solution by passing the oxygenating gas below the surface of said solution, thereby increasing the yield of fats as compared to surface growths.

3. A process for producing increased yields of fats which comprises submersing a fat-forming mold which develops chlamydospores in predominantly carbohydrate acidic nutrient solution, having a pH of 2.4 to 6.8, inducing fermentation of said solution and growing said molds in submersion therein while aerating the solution in a closed container by passing the oxygenating gas below the surface of said solution, thereby increasing the yield of fats as compared to surface growths.

4. A process for producing increased yields of fats which comprises submersing a fat-forming mold which develops chlamydospores in an acidic nutrient solution predominantly composed of a sugar and beer wort, inducing fermentation of said solution and growing said mold in submersion therein while aerating the solution and then continuing the growth of said mold during a quiescent period, thereby increasing the yield of fats as compared to surface growths.

5. A process for producing increased yields of fats which comprises submersing a fat-forming mold of genus Mucor that develops chlamydospores in an acidic nutrient solution, inducing fermentation of said solution and growing said mold in submersion therein while aerating the solution, thereby increasing the yield of fats as compared to surface growths.

6. A process for producing increased yields of fats which comprises submersing a fat-forming mold of genus Mortierella that develops chlamydospores in an acidic nutrient solution, inducing fermentation of said solution and growing said mold in submersion therein while aerating the solution, thereby increasing the yield of fats as compared to surface growths.

7. A process for producing increased yields of fats which comprises submersing a fat-forming mold of genus Gibberella that develops chlamydospores in an acidic nutrient solution, inducing fermentation of said solution and growing said mold in submersion therein while aerating the solution, thereby increasing the yield of fats as compared to surface growths.

8. A process for producing an increased yield of fats which comprises submersing the mold *Mucor racemosus* in a nutrient acidic solution, inducing fermentation of said solution and growing said mold submerged therein while aerating the solution by passing an oxygenating gas below the surface of said solution, thereby increasing the yield of fats as compared to surface growths.

9. A process for producing an increased yield of fats which comprises submersing the mold *Mortierella pusilla* in a nutrient acidic solution, inducing fermentation of said solution and growing said mold submerged therein while aerating the solution by passing an oxygenating gas below the surface of said solution, thereby increasing the yield of fats as compared to surface growths.

HELMUT DAMM.